United States Patent Office 3,772,339
Patented Nov. 13, 1973

1

3,772,339
PREPARATION OF NAPHTHALIDES
Richard B. Greenwald, Framingham, Mass., assignor to Polaroid Corporation, Cambridge, Mass.
No Drawing. Filed Oct. 26, 1971, Ser. No. 192,637
Int. Cl. C07d 7/26
U.S. Cl. 260—343.2 R          13 Claims

ABSTRACT OF THE DISCLOSURE

This invention relates to the synthesis of carboxy-substituted naphthol naphthalide indicator dyes by reacting a 3-(3'-carboalkoxy-4'-hydroxy naphthyl)naphthalide intermediate and a 1-naphthol in the presence of a Lewis acid catalyst and converting the 3'-carboalkoxy to a 3'-carboxy group to yield the dye product.

BACKGROUND OF THE INVENTION (1) Field of the invention

This invention relates to a novel method of preparing indicator dyes and, in particular, relates to a method of preparing certain phthaleins.

(2) Description of the prior art

Dyes which undergo a change in spectral absorption characteristics in response to a change in pH are well known in the art and frequently are referred to as indicator or pH-sensitive dyes. Typically, these dyes change from one color to another, from colored to colorless or from colorless to colored on the passage from acidity to alkalinity or the reverse and are commonly employed in analytical chemical procedures to measure changes in pH value. Among the indicator dyes most widely used is the group derived from phthaleins as exemplified by phenolphthalein, thymolphthalein, o-cresolphthalein and 1-naphtholphthalein.

A particularly useful method of preparing phthalein indicator dyes including both phthalides and naphthalides of certain hydroxy-substituted carbocyclic compounds and certain N-heterocyclic aryl compounds forms the subject matter of copending U.S. patent application Ser. No. 108,662 of Alan L. Borror filed Jan. 21, 1971. According to the method disclosed and claimed therein, such dyes are prepared (1) by reacting (a) a hydroxy-substituted carbocyclic aryl compound selected from a phenol and a 1-naphthol or an N-heterocyclic compound selected from an indole and a pyrrole and (b) phthalaldehydic or naphthalaldehydic acid to form the corresponding (na)phthalidyl-substituted intermediate; (2) oxidizing the intermediate; and (3) reacting the oxidation product with a carbocyclic or N-heterocyclic compound to form the complete dye. The expression "(na)phthalidyl" is intended to denote either the corresponding phthalidyl- or naphthalidyl-substituted intermediate depending upon the selection of phthalaldehydic or naphthalaldehydic acid.

This reaction scheme is illustrated below wherein A" represents the starting phenol, naphthol, indole or pyrrole which ultimately comprises the A radical of the indicator dye and B' represents the carbocyclic aryl or heterocyclic aryl compound which ulitmately comprises the B radical of the indicator dye and X represents the carbon atoms necessary to complete the phthalide or naphthalide moiety.

2

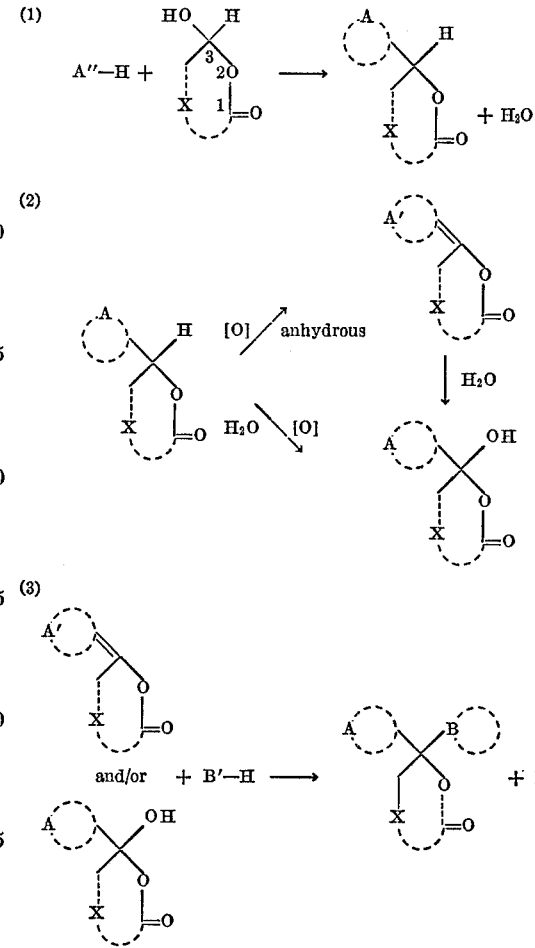

Since the reaction conditions of the above methods are comparatively mild, the starting materials need not be limited to the more stable compounds. For example, the more sensitive indole and phenolic compounds and their derivatives may be employed without decomposition and/or loss of substituents that frequently occurs in the Friedel-Crafts syntheses conventionally used in the production of phthaleins. Besides the greater latitude in the selection of starting materials, the oxidized intermediates may be reacted with any of various aromatic compounds to form a wide variety of indicator dyes including symmetrical, unsymmetrical and mixed phthalide and naphthalide dyes.

The present invention is concerned with an improved method in the production of indicator dyes by the reaction of a 1-naphthol naphthalide intermediate and a 1-naphthol to yield the corresponding naphthalide dye.

SUMMARY OF THE INVENTION

It is, therefore, the primary object of the present invention to provide an improved method of synthesizing indicator dyes.

It is another object of the present invention to provide a method of synthesizing 1-naphthol naphthalides which may be symmetrical or unsymmetrical dyes.

Other objects of this invention will in part be obvious and will in part appear hereinafter.

The invention accordingly comprises the process involving the several steps and the relation and order of one or more of such steps with respect to each of the others which are exemplified in the following detailed disclosure and the scope of the application of which will be indicated in the claims.

According to the present invention, an improved method of preparing carboxynaphthol naphthalides is provided wherein the improvement comprises reacting (a) a 3-(3'-carboxy-4'-hydroxy-1'-naphthyl)naphthalide intermediate as the 3'-carboalkoxy ester with (b) a 1-naphthol in the presence of a Lewis acid catalyst.

For a fuller understanding of the nature and objects of the present invention reference should be had to the following detailed description.

DESCRIPTION OF THE PREFERRED EMBODIMENT

It has been found according to the present invention that carboxy-substituted 1-naphthol naphthalides may be obtained in improved yields by employing a 3'-carboalkoxy rather than a 3'-carboxy-4'-hydroxynaphthyl naphthalide intermediate for reaction with a 1-naphthol to form the complete dye. While the improvement in product yield may be achieved using any of the acid catalysts conventionally employed in condensation reactions, particularly good results may be obtained by using Lewis acids to catalyze the reaction between the carboalkoxy naphthalide intermediate and the 1-naphthol, especially in the production of naphthol naphthalides where both naphthyl radicals contain a carboxy group adjacent to the naphtholic —OH. In the preparation of the latter dyes, it also has been found that the reaction between the intermediate and naphthol is facilitated by employing a 1-naphthol with the 2-carboxy substituent as the free acid group.

Specifically, the present method of preparing indicator dyes comprises:

(A) Reacting a solution of (a) a 3-X-3-(3'-carbo-alkoxy-4'-hydroxyl-1'-naphthyl)naphthalide wherein X is a leaving group and (b) a 1-naphthol in inert organic media at elevated temperature in the presence of a Lewis acid catalyst to form the corresponding 3-(3'-carboalkoxy-4'-hydroxy-1'-naphthyl) - 3 - (4' - hydroxy-1'-naphthyl) napthalide and (B) Converting said 3'-carboalkoxy to carboxy group to form the corresponding 3-(3'-carboxy-4'-hydroxy - 1' - naphthyl) - 3 - (4' - hydroxy - 1' - naphthyl) naphthalide.

This reaction sequence is illustrated below wherein X is a group, such as, OR wherein R is hydrogen, alkyl, aryl or alkaryl, R' is alkyl and B'—H represents the 1-naphthol which ultimately comprises the B radical, i.e., the second radical in the final dye.

(A)
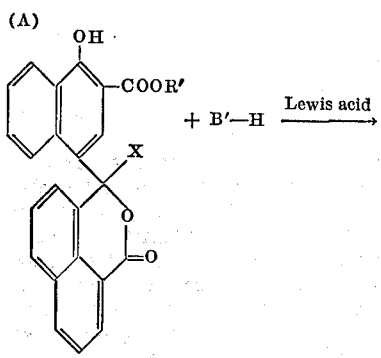
+ B'—H $\xrightarrow{\text{Lewis acid}}$

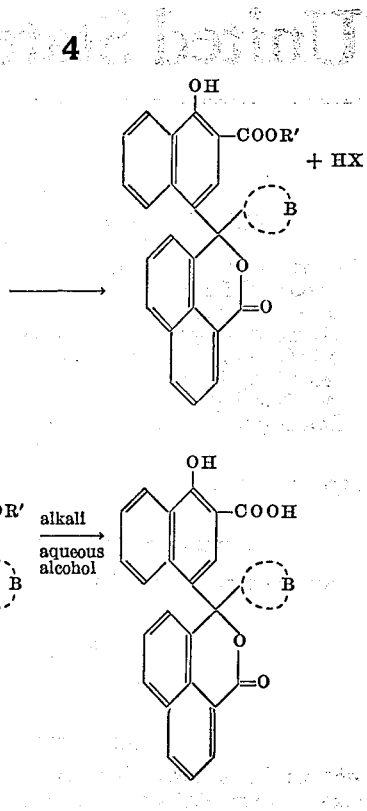

Typical of the indicator dyes that may be prepared according to the present invention are those represented by the formula:

(I)
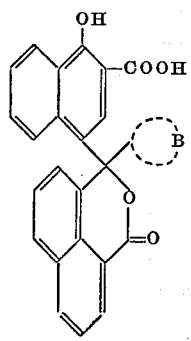

wherein B represents a 4'-hydroxy-1'-naphthyl radical.

The indicator dyes defined above and as represented in the above formula may contain additional substituents as may be desired which do not interfere with the function of the dye for its selected ultimate use. Typical substituents include alkyl, such as, methyl, ethyl, isopropyl, n-butyl, t-butyl, hexyl, octyl, dodecyl, hexadecyl, octadecyl and eicosanyl; aryl, such as, phenyl, 2-hydroxyphenyl, and naphthyl; alkaryl, such as, benzyl, phenethyl, phenylhexyl, p-octylphenyl, p-dodecylphenyl; alkoxy, such as, methoxy, ethoxy, butoxy, 1-ethoxy-2-(β-ethoxy-ethoxy), dodecyloxy and octadecyloxy; aryloxy, such as, phenoxy, benzyloxy, naphthoxy; alkoxyalkyl, such as, methoxyethyl, dodecycloxyethyl; halo, such as, fluoro, bromo, and chloro; trifluoralkyl, such as, trifluoromethyl, mono- and bis-trifluoromethyl carbinol; sulfonamido; sulfamoyl; acyl and its derivatives; aminomethyl; amido; sulfonyl; sulfo; cyano; nitro; amino including mono- and disubstituted amino, e.g., N-ethyl amino and N,N'-dimethylamino; carboxy; and hydroxyl. Such substituents may be substituted on one or both of the naphthyl radicals and/or on the naphthalide ring-closing moiety.

For use as optical filter agents in photographic processes, such as, diffusion transfer processes employing highly alkaline processing solutions, it may be desirable that the indicator dye selected as the optical filter agent possess a relatively high pKa so that the dye will be in a light-absorbing form during the initial stages of processing and yet may be rendered substantially non-light absorbing within a relatively brief interval as the pH subsequent to substantial image formation is reduced in order to permit early viewing of the image. Because of the carboxy substituent ortho to the functional —OH, the naphthol naphthaleins produced according to the present invention possess a relatively high pKa which makes them particularly useful as optical filter agents in the aforementioned processes. If desired, the 1-naphthol selected to provide the B radical also may contain a hydrogen-bonding group, such as, a carboxy group substituted on a carbon atom adjacent to the functional —OH.

As an illustration, in Formula I above, the B radical may comprise

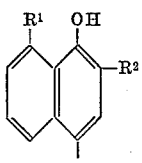

wherein one of $R^1$ and $R^2$, and preferably $R^2$, is a hydrogen-bonding group and the other is hydrogen. High pKa 1-naphthol phthaleins and naphthaleins substituted with hydrogen-bonding groups in this manner form the subject matter of copending U.S. patent application Ser. No. 103,865, filed Jan. 4, 1971.

As the $R^1$ or $R^2$ group, any hydrogen-bonding group may be used that is capable of raising the pKa. The association of two atoms through hydrogen to form a hydrogen bond between or within molecules is well known. When hydrogen is attached to an electronegative atom, for example, O or N , the resultant bond is polarized. If directed toward another atom (M) with an unshared pair of electrons, the hydrogen acts as a bridge between the atoms (O—H ... M) due to the electrostatic attraction to both atoms between which the hydrogen proton can be transferred. In the above compounds an intramolecular hydrogen bond is formed between the naphtholic —OH group and the adjacent hydrogen-bonding group, i.e., a group containing a heteroatom possessing an active unshared pair of electrons, such as, O, N, S or halogen, e.g., F., which has a free electron pair or a negative charge in basic solution and which is capable of forming a 5-, 6- or 7-membered and preferably a 5- or 6-membered hydrogen-bonded ring with the functional, i.e., naphtholic —OH. Preferably, the heteroatom in the hydrogen-bonding group has attached to it a proton which is more acidic than the proton on the naphtholic —OH and ionizes in basic solution to a negative charge. Such groups include, for example, carboxy; hydroxy; o-hydroxyphenyl; bis trifluoromethyl carbinol; sulfonamido (—NH—SO$_2$—R' wherein R' may be alkyl, aryl, alkaryl); and sulfamoyl (—SO$_2$—NH—R" wherein R" may be alkyl, aryl, alkaryl). Suitable R' and R" substituents include branched or straight chain alkyl, e.g., methyl, ethyl, isopropyl, n-butyl, t-butyl, hexyl, octyl, dodecyl, hexadecyl, octadecyl and eicosanyl; aryl, e.g., phenyl and naphthyl; and alkaryl, e.g., benzyl, phenethyl, phenylhexyl, p-octylphenyl and p-dodecylphenyl.

Specific examples of carboxy naphthol indicator dyes that may be prepared according to the method of the present invention are as follows:

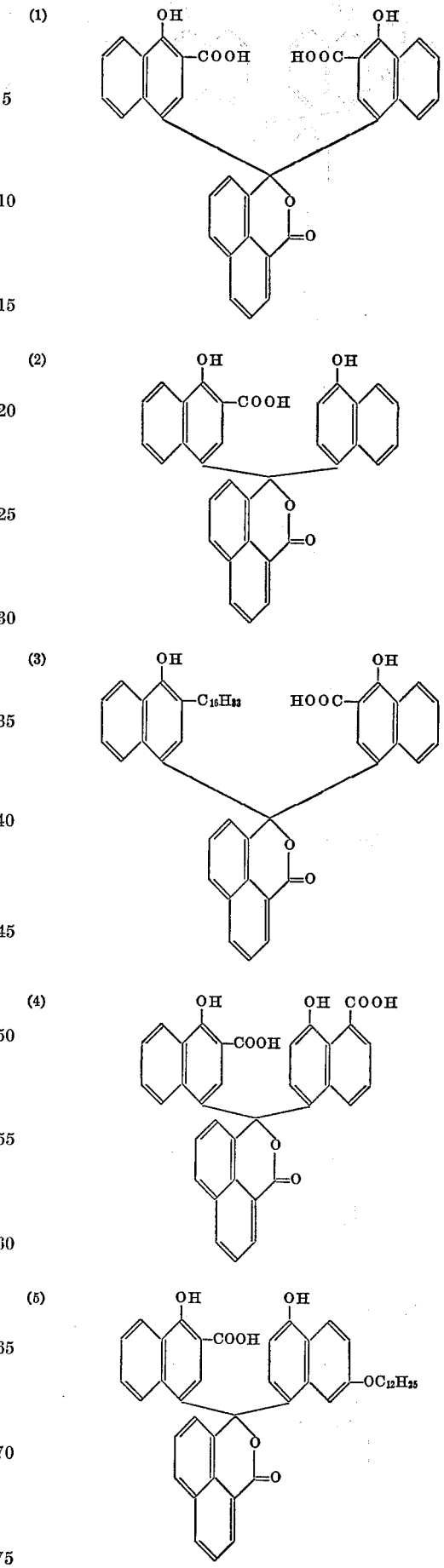

(6) 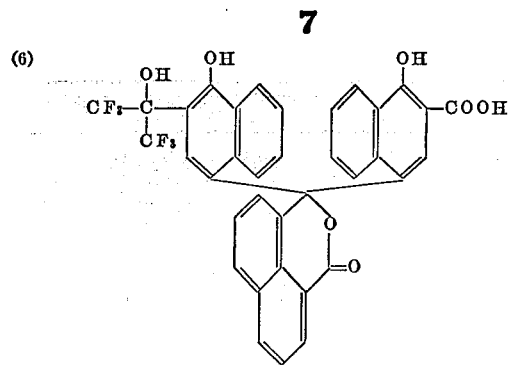

(7) 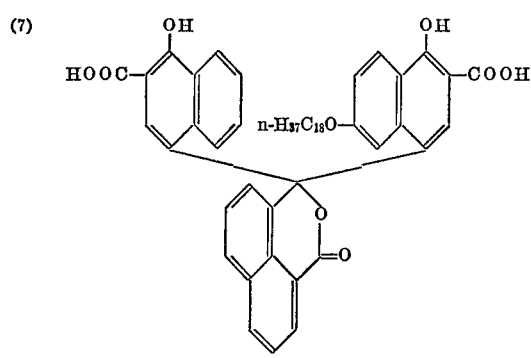

(8) 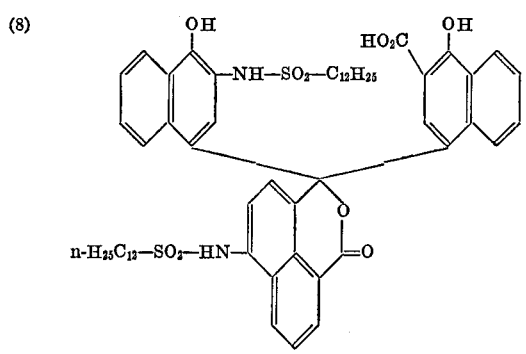

(9) 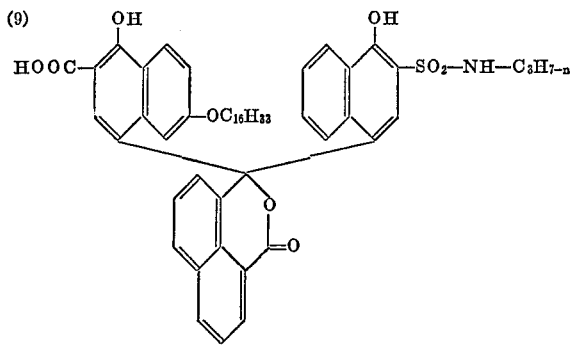

(10) 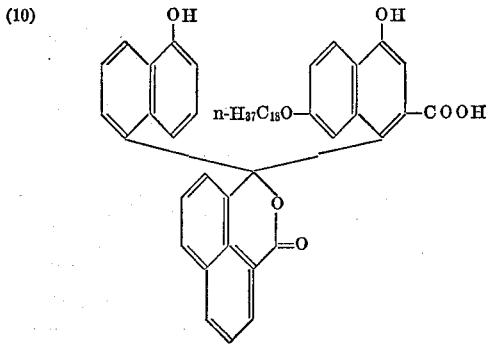

(11) 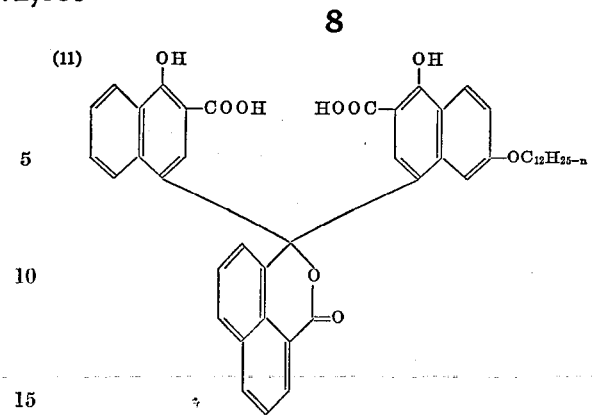

(12) 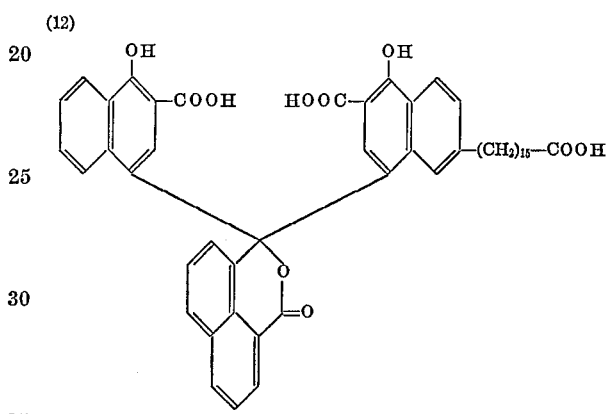

The intermediates employed in the present process may be represented by the following formula:

(II) 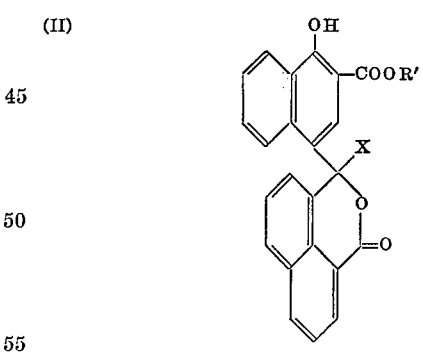

wherein R' is alkyl having 1 to about 20 carbon atoms, such as, methyl, ethyl, butyl, octyl, dodecyl, octadecyl, and X is an appropriate leaving group. Typical of such groups are —SR⁰ wherein R⁰ is hydrogen, alkyl, aryl and alkaryl and particularly, —OR wherein R is hydrogen, alkyl, aryl and alkaryl. Suitable R⁰ and R substituents include methyl, ethyl, butyl, octyl, phenyl, benzyl, and p-ethylphenyl.

Such intermediates, e.g., a 3-hydroxy-3-(3'-carboalkoxy-4'-hydroxy-1'-naphthyl)naphthalide may be prepared by reacting a 1-hydroxy-2-alkyl naphthoate with naphthalaldehydic acid in the presence of an acid catalyst to form the corresponding 4-naphthalidyl-1-hydroxy-2-alkyl naphthoate. The naphthalidyl-substituted naphthoate thus obtained may be oxidized to form the ketol directly or oxidized under anhydrous conditions to form a dehydro intermediate which upon hydration yields the ketol. This reaction sequence is illustrated below.

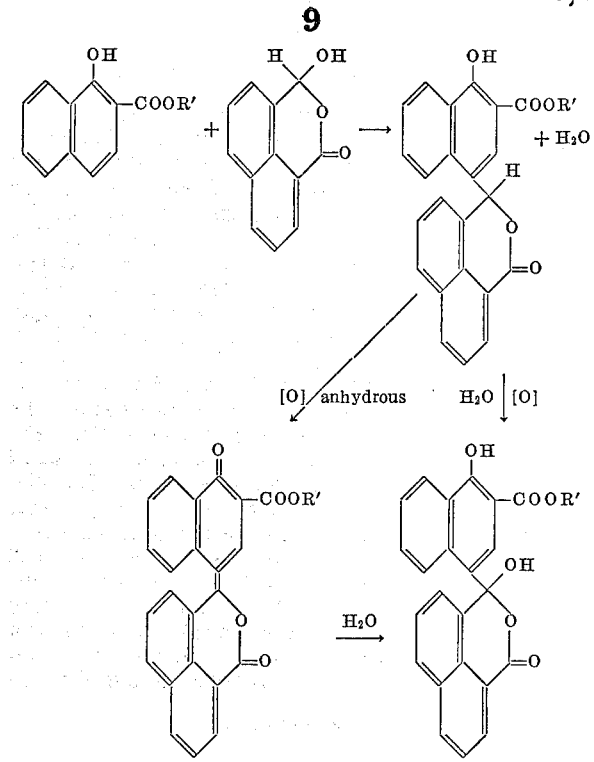

Ketol and dehydro intermediates of certain naphthalidyl-substituted N-heterocyclic compounds and of certain naphthalidyl - substituted n - hydroxy carbocyclic compounds, such as, those above and their synthesis by the method illustrated above also are included in the subject matter of aforementioned U.S. patent application Ser. No. 108,662.

The ketol also may be prepared by other methods. For example, 3 - hydroxy - 3 - (3' - carboalkoxy-4'-hydroxy-1'-naphthyl)naphthalide may be prepared by forming a complex solution of a 1-hydroxy-2-alkyl naphthoate by treating the naphthoate with anhydrous aluminum chloride followed by the addition of solvent, such as, nitrobenzene and then reacting the complex solution with 3,3-dichloro naphthalide. This reaction sequence is illustrated below.

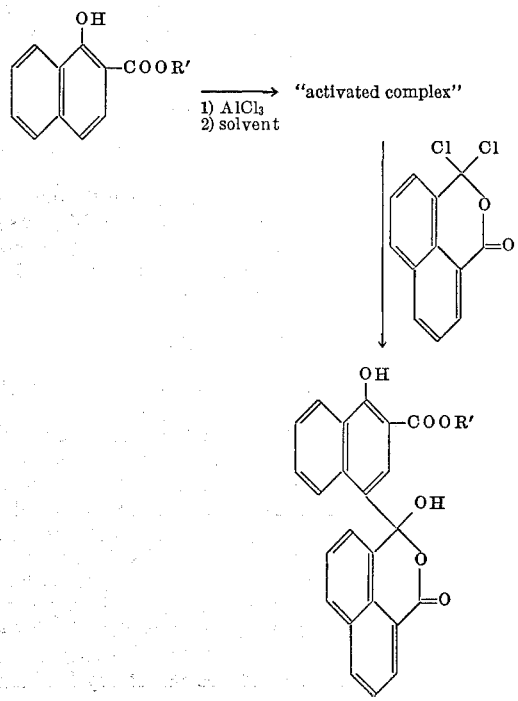

The 3-alkoxy naphthalide intermediates may be prepared, for example, by reacting the 3-hydroxy or dehydro intermediate with a lower alkanol to form the corresponding 3-OR naphthalide. The 3-SR⁰ group may be introduced by adding R⁰SH to a solution of 3-hydroxy intermediate in methanol containing toluene-p-sulfonic acid. Alternatively, both the 3-OR and 3-SR⁰ naphthalide intermediates may be synthesized by the addition of ROH and R⁰SH to a 3-halo intermediate, for example, a 3-chloro-3-(3'-carboalkoxy - 4'-hydroxy-1'-naphthyl)naphthalide.

In carrying out the present method, the naphthalide intermediate and the selected 1-naphthol are reacted in organic solution at the appropriate temperature and in the presence of a Lewis acid catalyst. The reaction temperature may vary over a relatively wide range from room temperature, i.e., about 20° C. up to a temperature of about 130° C. To achieve practical reaction rates, the reaction usually is conducted at elevated temperatures between about 80° and 100° C.

The organic media may comprise any inert organic liquid that is a solvent for the reactants, such as, tetrahydrofuran, petroleum ether, hexane, heptane, cyclohexane, toluene, methylene chloride, benzene, dimethoxyethane, dimethylsulfoxide, 1,4-dioxane, glacial acetic acid, and N,N-dimethylformamide.

The acid catalyst may be any of the Lewis acids conventionally employed in condensation reaction, such as, toluene-p-sulfonic acid, trifluoroacetic acid, trichloracetic acid, zinc chloride and preferably, boron trifluoride-etherate. With the latter catalyst, particularly good yields are obtained.

The 1-naphthol selected for reaction with naphthalide intermediate may contain one or more substituents as may be desired in the final dye provided that it has an unsubstituted 4-position, i.e., a free position para to the naphtholic —OH group. The method of the present invention, as discussed above, is especially useful in the preparation of 1-naphthol naphthalides wherein both of the 4'-hydroxy-1'-naphthyl radicals possess a 3'-carboxy group. In the synthesis of such dyes, it is preferred to use a 2-carboxy-1-naphthol for reaction with the naphthalide intermediate. Though the ester, i.e., 2-carboalkoxy-1-naphthol may be employed, naphthols having a free carboxy group have been observed to react more readily with the intermediate. Rather than carboxy groups, the 1-naphthol reactant may contain other substituents, such as, those enumerated above.

The proportion of reactants to achieve optimum results may be readily determined empirically. The 1-naphthol generally is used in an excess over the amount of naphthalide intermediate. A ratio of between about 1.0 and 3.0 equivalents of 1-naphthol per equivalent of intermediate has been found satisfactory. The catalyst ordinarily is employed in amounts ranging between about 1.0 and 1.5 equivalents based on the intermediate.

Conversion of the carboalkoxy group to the free acid group in step (B) may be accomplished in any suitable and convenient manner, for example, by hydrolysis, preferably alkaline hydrolysis. Conversion to the carboxy group is conveniently achieved by treating the carboalkoxynaphthol-naphthol naphthalide with an alkaline hydroxide in aqueous or aqueous alcohol solution. The alkaline hydroxide may be an alkaline earth hydroxide, such as, calcium or barium hydroxide or preferably, an alkali metal hydroxide, such as, sodium or potassium hydroxide. The alcohol employed is usually a lower alkanol, such as, methanol, ethanol or propanol.

The following examples are given to further illustrate the present invention and are not intended to limit the scope thereof.

EXAMPLE 1

Preparation of the compound of Formula 2

(a) Dry 1-hydroxy-2-naphthoic acid (50 gms., 0.266 mole) was suspended in 350 ml. dry benzene in a flame-dried 1 liter 1-neck round bottom flask under an air condenser and drying tube. Thionyl chloride (31.7 gms., 0.266 mole) was added in one portion followed by 1.5 ml. dry N,N-dimethyl-formamide. The reaction mixture was stirred magnetically 2–3 days at room temperature. Insoluble material (6.5 gms.) was removed by filtration, and the yellow-tan filtrate was evaporated to dryness to give pale yellow 1-hydroxy-2-naphthoyl chloride, M.P. 87°–88° C. Chilled anhydrous methanol (100 ml.) was added quickly to the solid chloride in an exothermic reaction. The partial solution was heated about 5 minutes on the steam bath under a drying tube then allowed to cool. The suspension was chilled and the solid was collected to give 43 gms. (92% by weight) 1-hydroxy-2-methyl naphthoate.

(b) 1-hydroxy-2-methyl naphthoate (30.2 gms., 0.149 mole) was dissolved in 400 ml. of dry 1,1,2,2-tetrachloroethane in an Erlenmeyer flask fitted with a drying tube. The solution was chilled in an ice bath, and anhydrous aluminum chloride (84 gms., 0.625 mole) was added cautiously in portions. After about one-third of the catalyst was added, vigorous hydrogen chloride evolution ceased so that subsequent addition could be made more rapidly. Nitrobenzene (100 ml.) was added to the chilled dark green suspension, and the mixture was swirled intermittently until a rich brown solution resulted. The complex solution was allowed to stand for about ½ hour before use.

3,3-dichloronaphthalide (37.8 gms., 0.149 mole) was dissolved in 100 ml. of 1,1,2,2-tetrachloroethane in a flame-dried 2 liter 3-neck round botom flask fitted with an addition funnel, air condenser, mechanical stirrer and drying tube. The solution was chilled in an ice bath; the previously prepared complex solution was decanted into the addition funnel and added dropwise over 30–60 minutes to the well-stirred reaction mixture. A rich purple color developed immediately. The reaction mixture was stirred and allowed to come to room temperature overnight.

Excess ice (300–500 gms.) was added cautiously to the almost solid reaction mixture followed by 20 ml. concentrated hydrochloric acid; the addition funnel and condenser were replaced by a Claisen distillation head, and the organic solvents were distilled with steam. The crude product separated as a yellow-brown solid from the hot dilute acid; it was collected directly, and air dried overnight.

Drying was completed in a vacuum oven, and the dried solid was taken up in hot glacial acetic acid (about 1 g./10 ml.) and insoluble material was removed by filtration; the ketol crystallized on standing and was collected and dried. Trace impurities were removed by solution in hot toluene (about 1 g./5 ml.) from which any insoluble material was separated. Recovery of 3-hydroxy-3-(3'-carbomethoxy-4'-hydroxynaphthyl) napthalide-1,8 was about 50–60% by weight.

(c) A solution of 1 equivalent of the naphthalide obtained in step (b) and 3 equivalents of 1-naphthol was prepared in dry acetic acid (about 1 gm./15 ml.). Boron trifluoride-etherate (1 equivalent) was added, and the reaction mixture was heated to reflux for several hours. The solid which precipitated was collected and washed with ether and then hydrolyzed with hot methanolic sodium hydroxide to yield the title compound (melting range 277°–279° C.).

EXAMPLE 2

Preparation of the compound of Formula 5

3-hydroxy-3-(3'-carbomethoxy - 4' - hydroxynaphthyl) naphthalide-1,8 (2.0 gms.) was suspended in 250 ml. of anhydrous methanol and the suspension saturated with dry hydrogen chloride gas. Most of the solid dissolved to give an amber solution. The solution was refluxed for 30 minutes, cooled and the solvent removed in vacuo. The residue was triturated with ether and filtered. After recrystallization from chloroform-isopropanol, 1.5 gms. of 3-methoxy-3-(3'-carbomethoxy-4'-hydroxynaphthyl) naphthalide was obtained (melting range 232°–233° C. dec.).

A mixture of 3-methoxy - 3 - (3'-carbomethoxy-4'-hydroxynaphthyl) naphthalide (1.5 gms.), 6-dodecyloxy-1-naphthol (1.2 gms.) and boron trifluoride-etherate (0.8 gm.) in 100 ml. of benzene was refluxed overnight. The reaction mixture was evaporated to dryness and heated on a steam bath with methanol-petroleum ether. The solid material was collected by filtration, boiled in isopropanol and filtered. The solid was dissolved in tetrahydrofuran and extracted with 6% aqueous sodium hydroxide (20 ml.). The organic solution was then extracted with 20% hydrochloric acid. Sodium chloride and dichloromethane were added and the solution was dried over magnesium sulfate and evaporated to dryness. The residue was recrystallized from benzene-isopropanol to give the title compound.

EXAMPLE 3

Preparation of the compound of Formula 3

A solution of 3-hydroxy - 3 - (3'-carbomethoxy-4'-hydroxynaphthyl) naphthalide-1,8 (528 mgs.), 2-hexadecyl-1-naphthol (480 mgs.), and boron trifluoride-etherate (184 mgs.) in glacial acetic acid (12 cc.) was refluxed 3 hours. The solution was cooled and evaporated to half-volume. On standing a solid formed which was purified by recrystallization from ethanol.

A solution of 0.8 gm. of the solid obtained above in 25 ml. of ethanol was treated with 5 ml. of 10% sodium hydroxide. After heating the solution on the steam bath for 2 hours, the reaction mixture was cooled and acidified with 20% hydrochloric acid. A gum precipitated and was scratched and triturated with water until solidification was complete. The solid was air dried and then dissolved in boiling cyclohexane. A white solid precipitated from the hot solution almost immediately which was collected to yield 0.5 gm. of the title compound (melting range 214°–215° C.).

EXAMPLE 4

Preparation of the compound of Formula 7

The title compound was prepared following the procedure of Example 3 above by reacting 3-hydroxy-3-(3'-carbomethoxy - 4' - hydroxy - 1' - naphthyl)naphthalide and 1-hydroxy-6-octadecyloxy-2-naphthoic acid in the presence of boron trifluoride-etherate.

EXAMPLE 5

Preparation of the compound of Formula 11

The title compound was prepared according to the procedures of Example 4 above except that the 1-naphthol employed was 1-hydroxy-6-dodecyloxy-2-naphthoic acid.

The 6-alkoxy-1-naphthols employed in the above examples were prepared by reacting the selected 1,6-dihydroxynaphthalene with an alkyl halide under alkaline conditions. As an illustration, the 1-hydroxy-6-octadecyloxy-2-naphthoic acid employed in Example 4 above was prepared by adding sodium methoxide (67.4 gms., 1.35 moles) to a solution of 1,6-dihydroxy-naphthalene (100 gms., 0.625 mole) in 900 ml. of dry N,N-dimethylformamide saturated with dry carbon dioxide gas. A steady flow of carbon dioxide was maintained throughout the reaction. Approximately 125 ml. of dimethylformamide was distilled and the mixture was then refluxed for 15 minutes and an additional 125 ml. of solvent removed. The solution was cooled and the flow of carbon dioxide stopped. The reaction mixture was acidified with concentrated hydrochloric acid and then poured onto about 2000 gms. of ice. The precipitated dark solid was filtered and dried and then triturated with 1 liter of boiling benzene and filtered free of dark impurities. Recrystallization from methanol water gave 1,6-dihydroxy-2-naphthoic acid as a white solid (melting range 220°–221° C.).

To a well-stirred slurry of 1,6-dihydroxy-2-naphthoic acid (5.1 gms., 0.025 mole) in 50 ml. of dry isopropyl alcohol under nitrogen was added potassium t-butoxide (5.66 gms., 0.050 mole). The mixture was heated to reflux and stirred 10–15 minutes and then octadecyl bromide (8.35 gms., 0.025 mole) was added. The reaction was refluxed for 5 hours, cooled and acidified with 20% hydrochloric acid. The solid which precipitated was filtered and dried and recrystallized from absolute ethanol to give 3.8 gms. of grey solid. Further recrystallization from chloroform gave 2.3 gms. of 1-hydroxy-6-octadecyloxy-2-naphthoic acid as a white solid (melting range 164°–165° C.).

Example 4 above was repeated using 1-hydroxy-6-octadecyloxy-2-naphthoic acid prepared as follows:

1,6 - dihydroxy - 2 - naphthoic acid was dissolved in dry N,N-dimethylformamide (1 g./10 ml.) in a 3-neck round bottom flask fitted with mechanical stirrer, condenser and thermometer. Potassium tert-butoxide (2 eqv.) was added in a moderately exothermic reaction. The resulting partial solution of dipotassium salt was stirred for 0.5 hr. at 50° C. 1-bromo octadecane (1 eqv.) was added in one portion producing a mildly exothermic reaction. The reaction mixture was maintained at 70–75° C. for 14 hrs. and allowed to cool to room temperature. The solid which separated was collected by suction and washed with several portions of N,N-dimethylformamide and then ether. The cake was taken up in glacial acetic acid (1 g./1 ml.), heated on a steam bath for 0.5 hr., and allowed to cool to room temperature. The crystalline solid was collected, washed with small volumes of acetic acid and then ethanol. After drying the crude solid thoroughly, it was slurried in chloroform (1 g./3 ml.), heated to boiling and then cooled. The 1-hydroxy-6-octadecyloxy-2-naphthoic acid was collected as a crystalline material in about 80% by weight yield.

As noted previously, employing a carboxynaphthol naphthalide intermediate as the carboalkoxy compound facilitates the reaction with the 1-naphthol and in the preparation of 1-naphthol naphthalides wherein both naphthol radicals contain a 3'-carboxy group, the carboalkoxynaphthol naphthalide intermediate is preferably reacted with a carboxynaphthol containing the carboxy substituent as the free acid group. In Example 4 above, the naphthalide indicator dye product was obtained in a yield of about 30% by weight. In comparison, the yield was about 5% by weight when Example 4 was repeated using 3 - hydroxy - 3-(3' - carboxy - 4' - hydroxy-1'-naphthyl) naphthalide instead of the 3'-carboalkoxy naphthalide intermediate. The yield was also about 5% by weight when Example 4 was repeated using 1-hydroxy-6-octadecycloxy-2 - methyl naphthoate rather than 1 - hydroxy-6-octadecyloxy-2-naphthoic acid.

In these comparative examples, the 3-hydroxy-3-(3'-carboxy-4'-hydroxy-1'-naphthyl)naphthalide was prepared as follows.

The 1:1 adduct of 1-hydroxy-2-naphthoic acid and naphthalaldehydic acid, 0.74 g. (2.0 mmoles), was dissolved in 15 ml. of dry tetrahydrofuran and then diluted in 15 ml. of methylene chloride. Dichlorodicyano benzoquinone, 0.5 g. (2.2 mmoles), was added to the solution and the reaction mixture refluxed for 16 hrs. The mixture was filtered and the filtrate taken to dryness. The residue was triturated with methylene chloride and filtered again. Evaporation of solvent left crude quinone methide which was taken up in 10% aqueous sodium hydroxide solution, charcoaled and the ketol acid precipitated by addition of 10% hydrochloric acid to give 0.6 g. of solid. Recrystallization from glacial acetic acid gave 0.45 g. of 3-hydroxy-3 - (3' - carboxy-4'-hydroxy-1'-naphthyl)naphthalide-1,8. The 1 - hydroxy - 8 - octadecyloxy-2-methyl naphthoate was prepared by reacting the corresponding 2-naphthoic acid with anhydrous methanol according to the procedure of step (a) in Example 1 above.

The indicator dyes produced in accordance with the present invention may be employed in analytical procedures where phthalein indicators are commonly used, for example, to measure changes in pH value and find other uses as well. As discussed above, it has been found that a selectively exposed photosensitive material having a latent image therein may be processed in the presence of extraneous incident radiation actinic thereto by reason of the protection afforded by suitably positioning with respect to the exposure surface of the photosensitive layer an effective concentration of a selected dye or dyes as optical filter agents. The use of certain dyes derived from phenolic compounds including carboxynaphthol naphthalides as optical filter agents for protecting photosensitive materials from radiation in the longer wavelength region of the visible spectrum forms the subject matter of application Ser. No. 103,392, now U.S. Pat. No. 3,702,245.

Since certain changes may be made in the above process without departing from the scope of the invention herein involved, it is intended that all matter contained in the above description shall be interpreted as illustrative and not in a limiting sense.

What is claimed is:

1. A method of preparing a naphthalide indicator dye which comprises (A) reacting (a) a 3-X-3-(3'-carboalkoxy-4'-hydroxy-1'-naphthyl)naphthalide wherein X is —OR and R is hydrogen or alkyl containing 1 to 8 carbon atoms and the alkoxy of said 3'-carboalkoxy contains 1 to 20 carbon atoms and (b) a naphthol selected from 1-naphthol and 1-naphthol substituted in the 2-position with alkyl or a hydrogen-bonding group selected from carboxy, hydroxy, o-hydroxyphenyl, bis trifluoromethyl carbinol, sulfonamido and sulfamoyl, said naphthol being substituted in the 6-position with hydrogen or alkoxy containing 1 to 18 carbon atoms in inert organic media at elevated temperature in the presence of a Lewis acid catalyst to form the corresponding 3-(3'-carboalkoxy-4'-hydroxy-1'-naphthyl)-3-(4'-hydroxy - 1' - naphthyl)naphthalide and (B) converting said 3'-carboalkoxy to a carboxy group by alkaline hydrolysis to form the corresponding 3-(3'-carboxy-4'-hydroxy-1'-naphthyl)-3-(4'-hydroxy-1'-naphthyl)naphthalide.

2. A method as defined in claim 1 wherein said catalyst is boron trifluoride-etherate.

3. A method as defined in claim 1 wherein said R is alkyl.

4. A method as defined in claim 1 wherein said R is hydrogen.

5. A method as defined in claim 1 wherein said 3'-carboalkoxy is 3'-carbomethoxy.

6. A method as defined in claim 2 wherein said (a) is 3-hydroxy-3-(3'-carbomethoxy-4'-hydroxy-1'-naphthyl) naphthalide.

7. A method as defined in claim 6 wherein said (b) is 1-naphthol.

8. A method as defined in claim 6 wherein said (b) is 2-hexadecyl-1-naphthol.

9. A method as defined in claim 6 wherein said (b) is a 1-hydroxy-2-naphthoic acid.

10. A method as defined in claim 9 wherein said acid is 1-hydroxy-6-octadecyloxy-2-naphthoic acid.

11. A method as defined in claim 9 wherein said acid is 1-hydroxy-6-dodecyloxy-2-naphthoic acid.

12. A method as defined in claim 2 wherein said (a) is 3-methoxy-3-(3'-carbomethoxy-4'-hydroxy-1'-naphthyl)naphthalide.

13. A method as defined in claim 12 wherein said (b) is 6-dodecyloxy-1-naphthol.

References Cited
UNITED STATES PATENTS 3,564,019  2/1971  Holmlund et al. ___ 260—343.2 X JOHN M. FORD, Primary Examiner U.S. Cl. X.R.

96—48 HC; 252—300. 408